W. F. FOLMER.
PHOTOGRAPHIC SHUTTER.
APPLICATION FILED JAN. 24, 1907.

932,381.

Patented Aug. 24, 1909.

2 SHEETS—SHEET 1.

Witnesses
Walter B. Payne.
Clarence A. Bateman.

Inventor
William F. Folmer
By Church & Rich
His Attorneys

W. F. FOLMER.
PHOTOGRAPHIC SHUTTER.
APPLICATION FILED JAN. 24, 1907.

932,381.

Patented Aug. 24, 1909.

UNITED STATES PATENT OFFICE.

WILLIAM F. FOLMER, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

PHOTOGRAPHIC SHUTTER.

932,381.  Specification of Letters Patent. Patented Aug. 24, 1909.

Application filed January 24, 1907. Serial No. 353,777.

*To all whom it may concern:*

Be it known that I, WILLIAM F. FOLMER, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters and it has for one of its objects to provide a simple and efficient shutter of the roller blind type and an operating device therefor having improved shutter actuating means that place both the duration and the extent of exposure effected by the shutter under the direct control of the operator up to the very instant the exposure is made and subject to change during the period of exposure.

To these and other ends the invention consists in certain improvements and combinations of parts, all as will be hereinafter more fully explained, the novel features being pointed out in the claims at the end of the specification.

Figure 1:
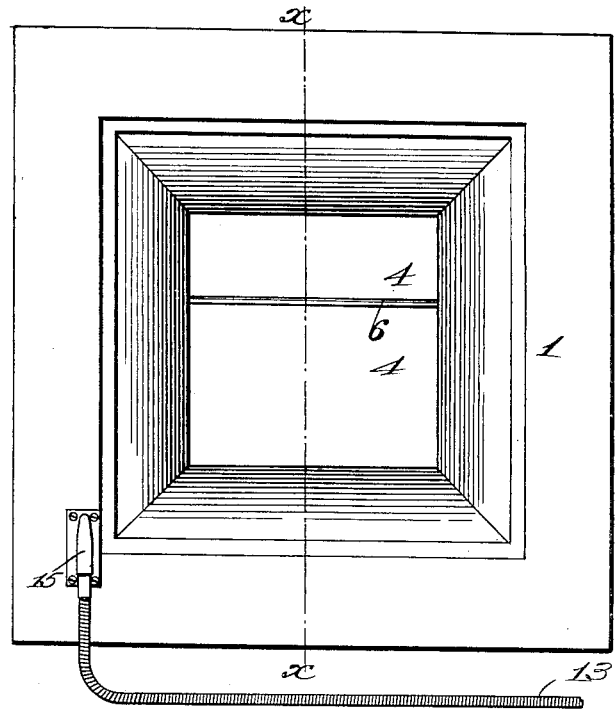
Figure 7:
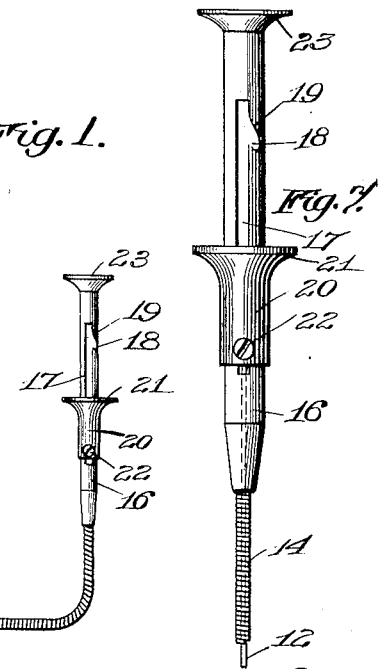
Figure 4:
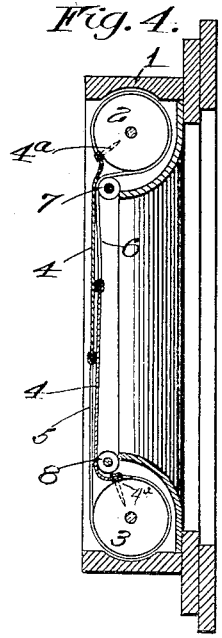
Figure 5:
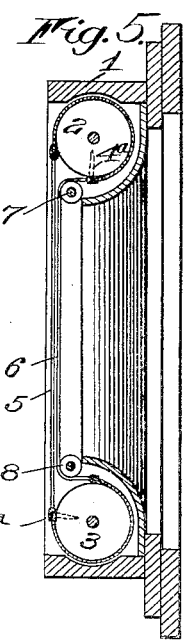
Figure 6:
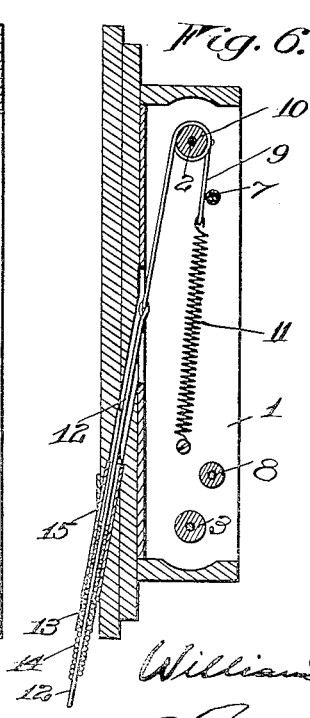
Figure 8:
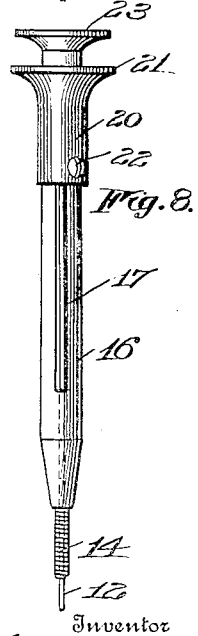
Figure 2:
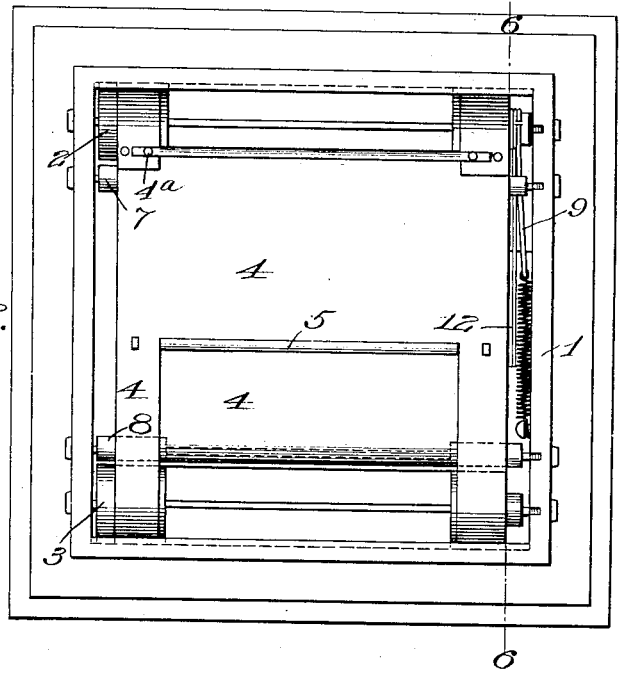
Figure 3:
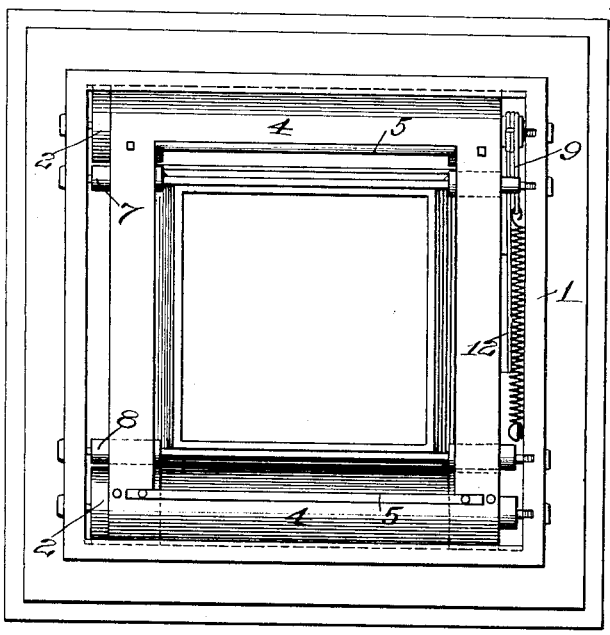

In the drawings: Figure 1 is a front elevation of a photographic shutter constructed in accordance with my present invention. Figs. 2 and 3 represent rear elevations of the shutter and its exposure mechanism, the curtain being in closed and open positions respectively. Figs. 4 and 5 represent sections on the line x—x of Fig. 1, showing the curtain in closed and open positions respectively. Fig. 6 represents a section on the line 6—6 of Fig. 2, showing the curtain-operating devices, and Figs. 7 and 8 are detail views of the shutter manipulating device.

Similar reference numerals in the several figures indicate similar parts.

The photographic shutter shown in the present embodiment of my present invention is of the roller blind type, and may be placed either in the focal plane of the lens or at any other suitable point between the lens and the sensitized material, and it comprises in the present instance a casing 1 adapted to form a chamber for the shutter mechanism, the latter comprising a pair of rollers 2 and 3 rotatably mounted on parallel axes at opposite sides of the shutter casing and having a flexible curtain or blind 4 passing over them. This curtain in the present form is composed of a single strip of flexible opaque material formed into a loop and extending over and between the two rollers described, and having its ends brought together and fastened as well as being secured at an intermediate point to the rollers as at the points 4ª. The looped curtain thus arranged is provided with exposure apertures 5 and 6 each of a size corresponding substantially to the area of the exposure opening of the shutter, and arranged on opposite sides of the loop of the curtain so that when the latter occupies the position shown in Fig. 4, the solid portions of the curtain extend from their respective rollers inwardly past the center of the exposure opening of the shutter, their inner edges overlapping as shown in Fig. 4, in order to effectually cut off the light, while when the rollers are rotated in an opposite direction, until the curtain occupies the position shown in Fig. 5, the two openings of the curtain will register and permit passage of light to effect the exposure.

In order to insure the complete cutting off of the light, it is preferable that those portions of the curtain forming the opposite sides of the loop extending between the rollers should lie closely together, or in substantially the same plane, and this is accomplished by placing guides or rollers as 7—8 adjacent to each roller, and just beyond the edge of the exposure opening of the shutter. There is thus provided in the opaque portions of the curtain, two parts movable relatively toward and from each other that define the actual exposure opening at any one actuation of the shutter, said relative movement being effected and controlled through the connection of the parts with one of the rollers. It is sometimes both desirable and convenient that the movements of the shutter members be under the direct control of the operator at the instant of exposure, and variable to meet conditions occurring at that time instead of being influenced by mechanical means which work with predetermined precision and require time for resetting. I therefore prefer to employ operating mechanism for the curtain which is manually operated and controls in this manner both the time and extent of the exposure, and in the present instance such mechanism comprises an operating cord 9 passing over a pulley 10 on the shaft of one of the rollers having a spring 11 attached to one end thereof and normally tending to turn the rollers to close the curtain, and having its other end attached to a cord or flexible member 12 passing out through an aperture in the casing, and through a hollow flexible member or conductor 13, the latter being composed in the present instance, of a helically-wound wire 14, provided with a braided covering and through which the operating cord is longitudinally movable. This hollow conductor is fastened at one end to the shutter casing by an attaching plate 15, and its free end is provided with devices for actuating the cord longitudinally relatively thereto comprising a guiding portion or tube 16 which is attached thereto in a manner that will prevent relative longitudinal movement between these parts. The guiding portion is provided with a longitudinal slot 17 having a notch or recess 18 in one of the lateral walls thereof, the upper wall of this notch or recess being inclined or formed with a cam-like surface, as at 19 which leads back into the longitudinal slot 17. On this guiding portion is mounted a slide or operating portion 20 connected with the cord 12 and provided with a flange or finger-engaging portion 21 at its upper end and having a screw or projection 22 thereon extending into the slot 17 of the guiding portion and adapted to engage in the notch when the slide and guiding portion are relatively turned, and the upper end of the guiding portion is preferably provided with a flange or thumb piece 23 arranged to coöperate with that of the slide or operating portion.

When it is desirable to produce an exposure of any of the usual extents or durations, the thumb of the operator is placed on the head 23 of the sleeve and the flange 21 is engaged by the fingers and a slight pressure will move these parts from the position shown in Fig. 7 to the position shown in Fig. 8, excepting that the projection 22 will remain in line with the slot 17. This movement serves to open the shutter, and by releasing the hold on the sleeve, the latter will spring back to normal position under the tension of the spring 11, and this serves to immediately close the curtain. It will thus be seen that the curtain is at all times under the direct control of the operator, and the time or extent of the exposure may be varied instantly as circumstances dictate. For instance, should the sky suddenly become clouded just at the moment the shutter is opened with the intention of making a brief time exposure, the operator can wait a little longer than he originally intended before releasing the actuating members in his hand that cause the closing of the shutter aperture and the termination of the exposure, and the plate will be saved, whereas, with curtain-shutters constructed with exposure openings of a fixed extent, which are actuated to travel across the field of exposure by a mechanical mover that must be set for each exposure, the said exposure is brought about with a previously determined mechanical precision that cannot be varied in time to meet the changed conditions.

Sometimes it is desirable to focus the camera, or produce an exposure of comparatively long duration wherein it is necessary to retain the shutter in open position for some time, and this can be accomplished without the necessity of retaining a hold of the hand on the shutter-operating devices by turning the slide relatively to the guiding portion after the former has been operated a sufficient distance for the projection 22 thereon to enter the recess or notch 18, which is offset from the slot 17 of the sleeve, and this will serve to retain the shutter in open position without the necessity of retaining a hold on the operating device, and in closing the shutter, it is merely necessary to draw the sleeve 20 toward the head 23 and release it, as the projection 22 coöperating with the inclined rear cam 19, leading from the recess, will turn the sleeve until the projection is again in line with the slot 17, and this will permit closing movement of the shutter.

A shutter constructed in accordance with my present invention may be manufactured at a slight cost and possesses the advantages of the focal plane or roller blind type of shutter, and the novel arrangement of the curtain enables a comparatively rapid exposure to be produced with a given speed of movement of the curtain. Furthermore, the improved operating device whereby the exposures are produced and controlled facilitates manipulation of the shutter in making exposures, and it is not only capable of producing the instantaneous bulb and time exposures as with the pneumatic bulb, but the operation is more positive and a prolonged pressure will not permit premature operation of the shutter releasing devices as sometimes occurs by reason of exhaustion of air from the bulb in pneumatically operating devices.

I claim as my invention:

1. In a photographic shutter, the combination with a suitable casing, rollers mounted therein, and a curtain having relatively movable portions defining the exposure opening adapted to be operated by said rollers to control the exposure, of an operating cord extending around the shaft of one of said rollers, a spring attached to one end of said cord and normally operating to close the curtain, and relatively movable operating members connected to the other end of said cord and to the casing respectively.

2. In a photographic shutter, the combination with a suitable casing, rollers mounted therein, and a curtain having relatively movable portions defining the exposure opening adapted to be operated by said rollers to control the exposures, of an operating cord extending around the shaft of one of said rollers, a spring attached to one end of said cord and normally operating to close the curtain by rotating the roller shaft through the medium of the cord, and operating means connected to the other end of said cord.

3. In a photographic shutter, the combination with a suitable casing, rollers mounted therein and a curtain, having relatively movable portions defining the exposure opening, operated by one of said rollers to control the exposures, of operating devices embodying a pair of relatively longitudinally movable members, one of the latter being secured to the casing, and the other being operatively connected to said operating roller, a device for moving one of said members longitudinally relatively to the other and means for holding said members in fixed relation to retain the exposure mechanism in a predetermined position.

4. In a photographic shutter, the combination with a suitable casing, rollers mounted therein and a curtain, having relatively movable portions defining the exposure opening, operated by one of said rollers to control the exposures, of operating devices embodying a hollow flexible conductor fixed at one end to the casing, a cord movable longitudinally of said conductor and operatively engaging said operating roller, devices on said cord for moving it relatively to the conductor to operate the exposure mechanism, and means for holding said cord and conductor in fixed relations.

5. In a photographic shutter, the combination with a suitable casing, rollers mounted therein and a curtain, having relatively movable portions defining the exposure opening, operated by one of said rollers to control the exposures, of operating devices embodying a pair of relatively longitudinally movable members, one of the latter being secured and the other being operatively connected to said operating roller, operating devices connected respectively to the said members, means for retaining said devices in predetermined fixed relation to hold the shutter in open position and means for releasing said devices and permitting the closing of the shutter.

6. In a photographic shutter, the combination with a suitable casing, rollers mounted therein and a curtain, having relatively movable portions defining the exposure opening, operated by one of said rollers to control the exposures, of operating mechanism therefor embodying a pair of longitudinally movable flexible members, one of the latter being operatively connected to said operating roller, a guiding portion connected to one of said members having a longitudinal slot therein and a lateral notch or recess in one of the walls of the latter, a slide attached to the other member and movable on said guiding portion and a projection on said slide adapted to coöperate with said slot and also with said recess of said guiding portion.

7. In a photographic shutter, the combination with a casing and parts carried thereby movable relatively toward and from each other to define the exposure opening, of operating mechanism for said parts comprising two relatively longitudinally movable members, one operatively connected with one of the parts and the other to the casing and devices for actuating one of said members relatively to the other comprising portions attached to each respectively and movable relatively to each other in one direction to actuate the members and in another to lock the latter and hold the parts in a predetermined relative position.

8. In a photographic shutter, the combination with a suitable casing, rollers mounted therein and a curtain having relatively movable portions defining the exposure opening operated by one of said rollers to control the exposures, of operating mechanism therefor comprising a hollow flexible conductor, a cord movable longitudinally therein and operatively connected to the operating roller, a tube carried by said conductor having a longitudinal slot therein and a recess in one wall leading into said slot and a sleeve connected with the cord to operate longitudinally of the tube and having a projection coöperating with the slot and recess of the latter.

9. In a photographic shutter, the combination with a suitable casing, rollers mounted therein and a curtain having relatively movable portions defining the exposure opening operated by one of said rollers to control the exposure opening, of operating mechanism therefor comprising a hollow flexible conductor, a cord movable longitudinally therein and operatively connected to the operating roller, a tube at the end of said conductor provided with a laterally extending finger portion and with a longitudinal slot having a recess in one wall, said recess being arranged to form a cam surface leading therefrom into the slot and a sleeve connected with the cord to operate longitudinally of the tube and provided with a laterally extending finger portion and with a projection coöperating with the slot and recess in the tube.

10. In a photographic shutter, the combination with a suitable casing, rollers mounted therein and a curtain having relatively movable portions defining the exposure opening adapted to be operated by said rollers to control the exposure, of a flexible operating cord or member extending around the shaft on one of said rollers and adapted to operate the latter in one direction and an extensible spring connected with the casing at one end and having a flexible connection at the other wound around the roller to operate the latter in the reverse direction.

WILLIAM F. FOLMER.

Witnesses:
 CLARENCE A. BATEMAN,
 ELIZABETH I. ALDRICH.